United States Patent [19]

Tanoshima et al.

[11] Patent Number: 5,097,456
[45] Date of Patent: Mar. 17, 1992

[54] OPTICAL HEAD

[75] Inventors: Katsuhide Tanoshima; Yasuo Shimizu; Minoru Ohtsuka; Masahiro Takahashi; Shizuo Nagata, all of Tokyo, Japan

[73] Assignee: Oki Electric Industry Co., Ltd., Tokyo, Japan

[21] Appl. No.: 459,799

[22] PCT Filed: Oct. 27, 1988

[86] PCT No.: PCT/JP88/01088
§ 371 Date: Apr. 16, 1990
§ 102(e) Date: Apr. 16, 1990

[87] PCT Pub. No.: WO89/04042
PCT Pub. Date: May 5, 1989

[30] Foreign Application Priority Data

Jan. 28, 1988 [JP] Japan .................. 63-15851
Jan. 28, 1988 [JP] Japan .................. 63-15852
Oct. 28, 1988 [JP] Japan .................. 62-270316

[51] Int. Cl.⁵ .................................. G11B 7/00
[52] U.S. Cl. .................... 369/44.15; 369/44.14; 369/44.19; 369/244
[58] Field of Search ............ 369/255, 249, 244, 44.13, 369/44.14, 32, 44.15, 215, 219, 220, 221, 222

[56] References Cited

U.S. PATENT DOCUMENTS 4,959,824  9/1990  Ueda et al. .................. 369/44.14

FOREIGN PATENT DOCUMENTS

0212697    3/1987  European Pat. Off. .
57 110069  7/1982  Japan .
59 162649  9/1984  Japan .
2078947    1/1982  United Kingdom .

Primary Examiner—Roy N. Envall, Jr.
Assistant Examiner—Nabil Hindi
Attorney, Agent, or Firm—Wenderoth, Lind & Ponack

[57] ABSTRACT

An optical head for use in an optical disk device holds individually an objective lens, an optical path converting prism and first and second relay lenses that are movably only in the direction of tracking. The objective lens and other members can be moved for the purpose of correcting any possible displacement of a track position of a light beam due to any eccentric arrangement involved and of a focusing position of the light beam due to a change in a relative distance between the lenses and due to surface deflection of a disk. The optical head thus allows easy assembly and adjustment thereof with simplified structure, higher resonance frequency, and high speed response.

3 Claims, 6 Drawing Sheets

OPTICAL HEAD

BACKGROUND OF THE INVENTION

1. Field of the Invention

The present invention relates to an optical head for use in a device for recording or reproducing optical information, by irradiating a disk-shaped recording medium (hereinafter referred to as a disk) with a light beam.

2. Prior Art

Figure 1:
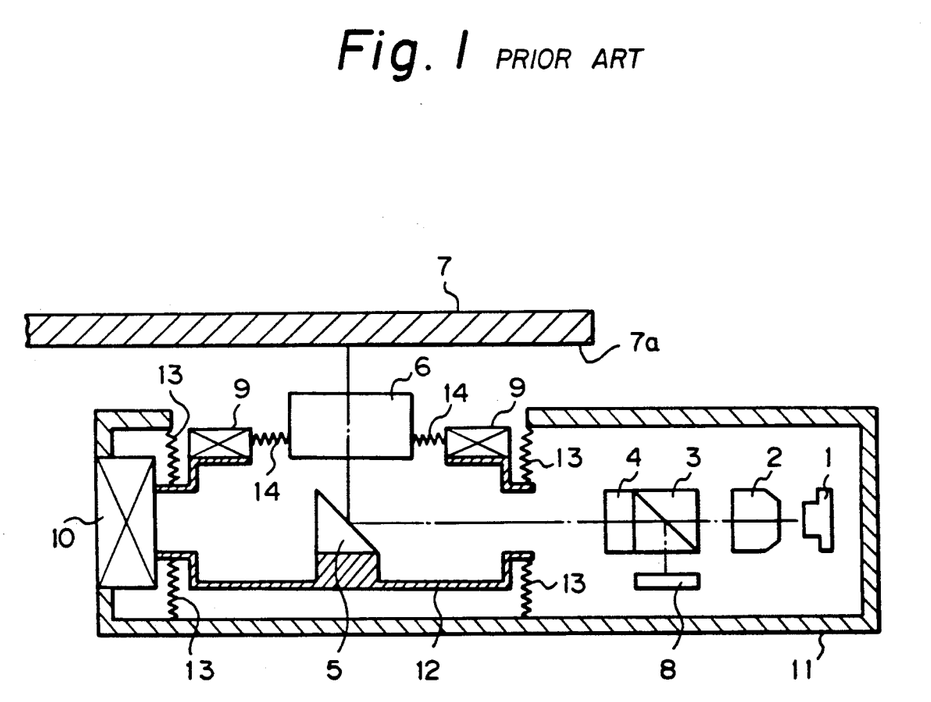
FIG. 1 is a cross-sectional view illustrating a conventional optical head.

Referring to FIG. 1, an example of a conventional optical head will be illustrated. As illustrated, a light beam emitted from an optical source 1 is directed toward a polarized beam splitter 3 and a λ/4 plate 4 via a coupling lens 2, diverted 90° by an optical path converting prism mirror 5, and focused onto a recording surface 7a of a disk 7 through an objective lens 6. The light means reflected back from the recording surface 7a is reflected on the reflecting plane of the polarized beam splitter 3, and detected by an optical detector 8.

The follow-up control of the focusing position and tracking position of the optical head arranged as described above is performed by the use of a focusing actuator 9 and a tracking actuator 10. To be concrete, the follow-up control is conventionally effected such that the focusing actuator 9 moves the objective lens 6 in a direction where a focal point is to be adjusted while the tracking actuator 10 moves in a direction of tracking, the objective lens 6, focusing actuator 9, optical path converting prism mirror 5, and a trackinhg movable part casing 12 for supporting the foregoing members, all those members being integrally united in a head casing 11.

The conventional optical head however requires a complicated precission mechanism because in the arrangement described above the tracking movable part casting 12 must be supported linearly movably only in a direction of the light beam emitted from the optical source 1 by a supporting members 13. Such conventional arrangement also requires the same mechanism because the objective lens 6 must be moved accurately linearly perpendicularly to the direction of the movement of the movable part casing 12 by a supporting member 14, the movable part casing moving in the direction of the optical path extending from the optical source 1. This conventional head has another problem in that it is difficult to assure accuracy in assembly and adjustment of the device because the directions of driving of the actuators 9, 10 are different, i.e. perpendicular to each other, and the supporting members 14, 13 are intervened respectively between the focusing actuator 9 and the objective lens 6, and between the tracking actuator 10 and the tracking movable part casing 12. Such conventional head furthermore suffers from a problem that the higher order resonance of the mechanism in the direction of the tracking is liable to occur in a low frequency region owing to the supporting member 14 because the objective lens 6 is supported through the movable part casing 12 and the supporting members 13, 14.

In view of the drawbacks of the conventional optical head, it is an object of the present invention to provide an improved optical head capable of avoiding the aforementioned problems and of restricting resonance frequencies to a high frequency region with a simplified structure.

SUMMARY OF THE INVENTION

In accordance with the present invention, an optical head comprises first and second holder means for fixedly mounting thereon first and second relay lenses, respectively, supporter means for supporting the first and second holder means movably only in a direction of disk tracking, and driving means for driving the first or second holder means in the direction of the tracking respectively to control signals concerning the displacement of a tracking position and a focusing position. The optical head can hereby be simplified in its structure and provide the resonance frequency restricted to a high frequency range.

DETAILED DESCRIPTION OF THE INVENTION

Figure 2:
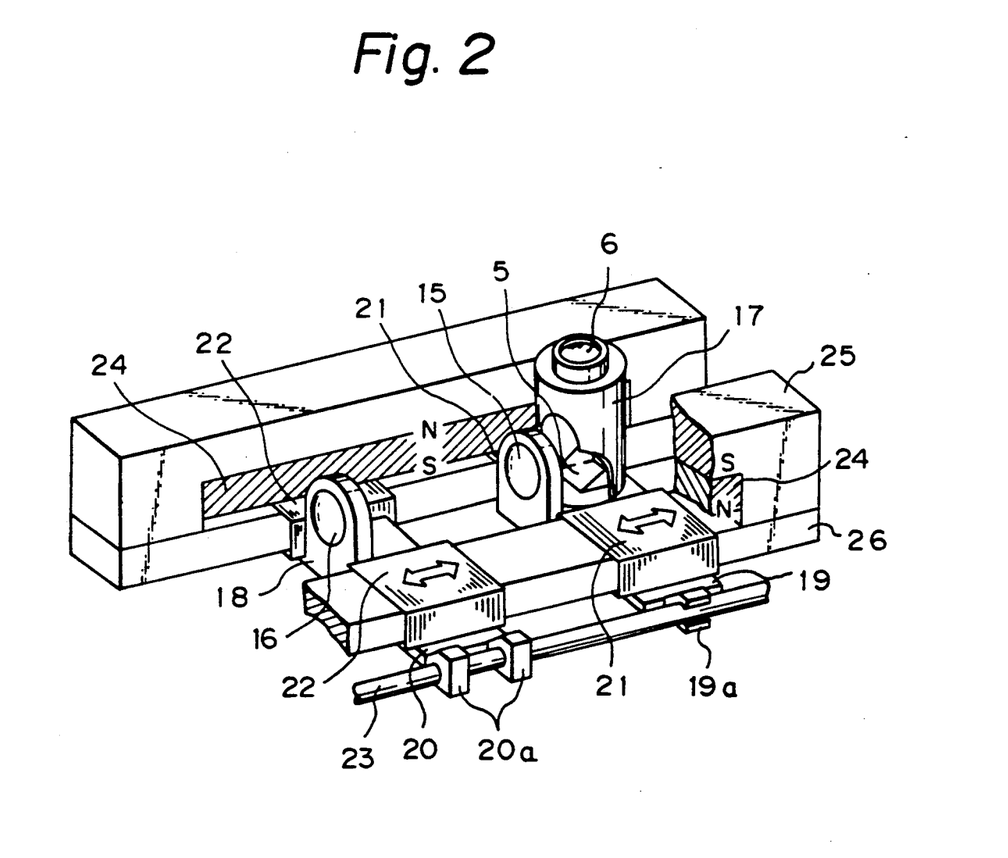
FIG. 2 is a perspective view, cut away in part, illustrating an optical head according to the present invention.

Referring to FIG. 2, an embodiment of an optical head according to the present invention is iillustrated, in which like sysmbols are applied to like elements of the prior art arrangement of FIG. 1. That is, designated at 5 is an optical path converting prism mirror, 6 is an objective lens, 15 and 16 are first and second lenses, respectively, 17 and 18 are first and second holders, respectively, 19 and 20 are carriages, 21 and 22 are pairs of coils, 23 is a guide shaft, 24 are magnets, and 25 and 26 are yokes.

The optical path converting prism mirror 5 and the objective lens 6 are fixedly held by the first holder 17 together with the first relay lens 15, all such members being mounted on the carriage 19. The carriage 19 is supported for axial movement only on a pair of the guide shafts 23 via sliding parts 19a provided on oposite ends of carriage 19 (only one sliding part 19a and guide shaft 23 are shown in the FIG. 2). The second relay lens 16 is fixedly held by the second holder 18, which holder is then mounted on the carriage 20. The carriage 20 is supported on the pair of guide shafts 23 for axial movement only via sliding parts 20a (only one is shown) provided on opposite ends of the carriage 20. The first and second relay lenses 15, 16 have the same optical axis which is parallel to the axes of the guide shafts 23.

Additionally, the pair of coils 21 are disposed on opposite sides of the holder 17 mounted on the carriage 19, and have a common axis parallel to the axes of the guide shafts 23. Likewise, the pair of coils 22 are disposed on opposite sides of the holder 18 mounted on the carriage 20, and have a common axis parallel to the axes of the guide shafts 23. The coils of each coil pair 21, 22 are disposed, spaced slightly from each other, around the respective yoke 26 constituting a magnetic circuit together with the pair magnet 24 and the respective yoke 25. The coils move the carriage 19, 20 axially of the guide shafts 23 in response to a driving current supplied from a control circuit described later.

In the above respective arrangements, a head casing (not shown) houses the pair of the guide shafts 23, the magnets 24, and the yokes 25 and 26, all fixedly mounted therein, such that the holders 17, 18 move in the direction of tracking of a disk. There also are included the same optical source, polarized beam splitter, λ/4 plate, and optical detector, etc., as in the conventional arrangement on the opposite side of the relay lens 16 from the relay lens 15. The light beam reaches the optical path converting prism mirror 5 via the relay lenses 16, 15, diverted 90° at mirror 5, focused by the objective lens 6, and directed toward the recording surface of the disk (not shown). The light beam is reflected back from the recording surface of the disk through the objective lens 6, optical path converting prism mirror 5, and relay lenses 15, 16.

Figure 3:
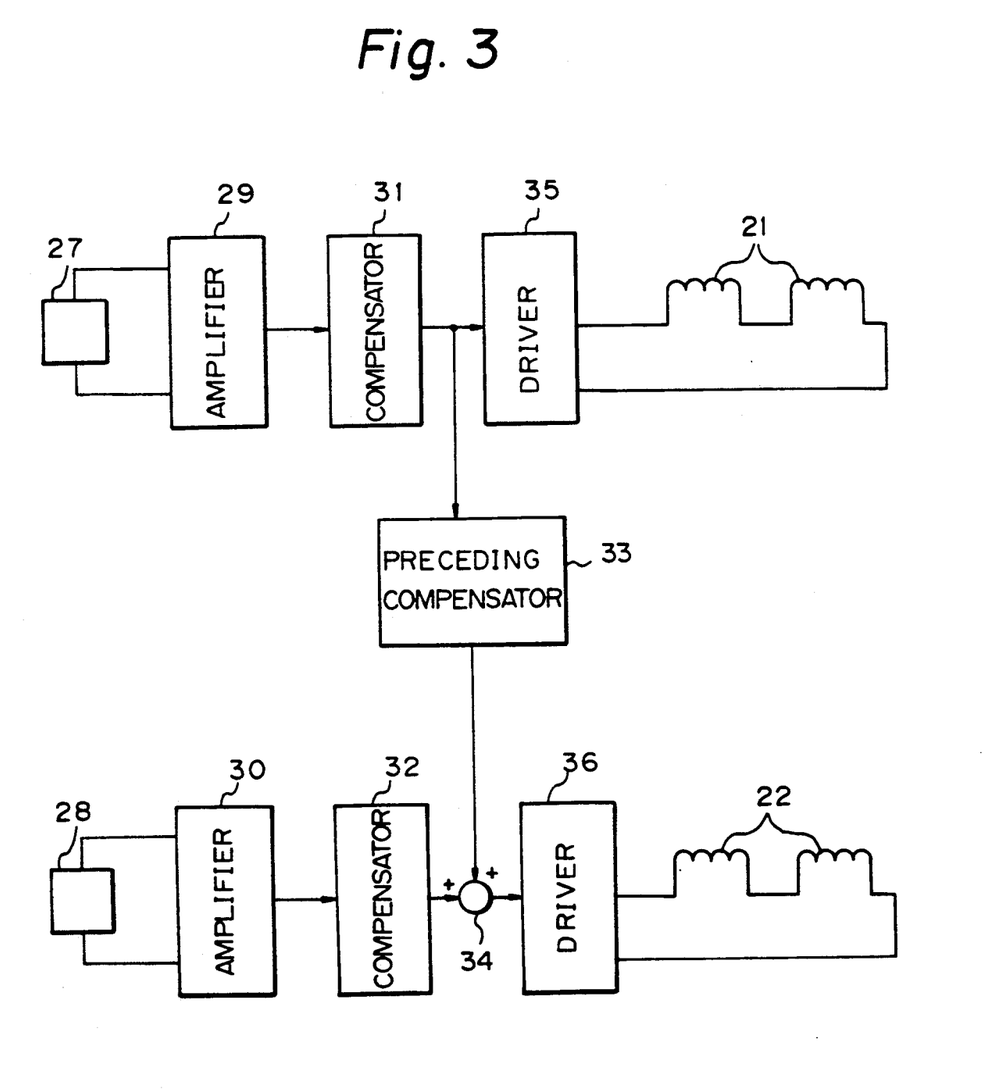
FIG. 3 is a control circuit for controlling tracking and focal point adjustments.

FIG. 3 illustrates a control circuit for controlling tracking and focal point adjustment of the foregoing device. In FIG. 3, designated at 27, 28 are optical detector elements, 29, 30 are amplifiers, 31, 32 are compensators, 33 is a preceding compensator, 34 is an adder circuit, and 35, 36 are drivers.

In the optical detector elements 27, 28, which correspond to the optical detector 8 illustrated in FIG. 1, the former optical detector 27 generates, upon the light beam being displaced from a predetermined track position, a voltage having an amplitude corresponding to the displacement and a polarity (+) or (−) corresponding to a direction of the same, while the optical detector element 28 generates likewise upon the light beam being displaced from a predetermined focal position, a voltage having an amplitude corresponding to the displacement and a polarity (+) or (−) corresponding to a direction of the same.

The amlifiers 29, 30 amplify output voltages from the optical detector elements 27, 28, respectively, while the compensators 31, 32 compensate in proper output voltages from the amplifiers 29, 30, respectively. The preceding compensator 33 receives part of an output voltage from the compensator 31, reverses its signal, and delivers it to the adder 34, as described later. The adder 34 adds the output voltages from the compensator 32 and the preceding compensator 33. The drivers 35, 36 supply a driving current (control signal) to the coils 21, 22 in conformity with the output voltages from the compensator 31 and the adder 34 to move the carriage 19 or 20, i.e., the relay lens 15 or 16, for the purpose of correcting the displacements of the track position and the focal position, as described later. Here, the circuits described above are conventionally well known excepting the preceding compensator 33.

Figure 4:
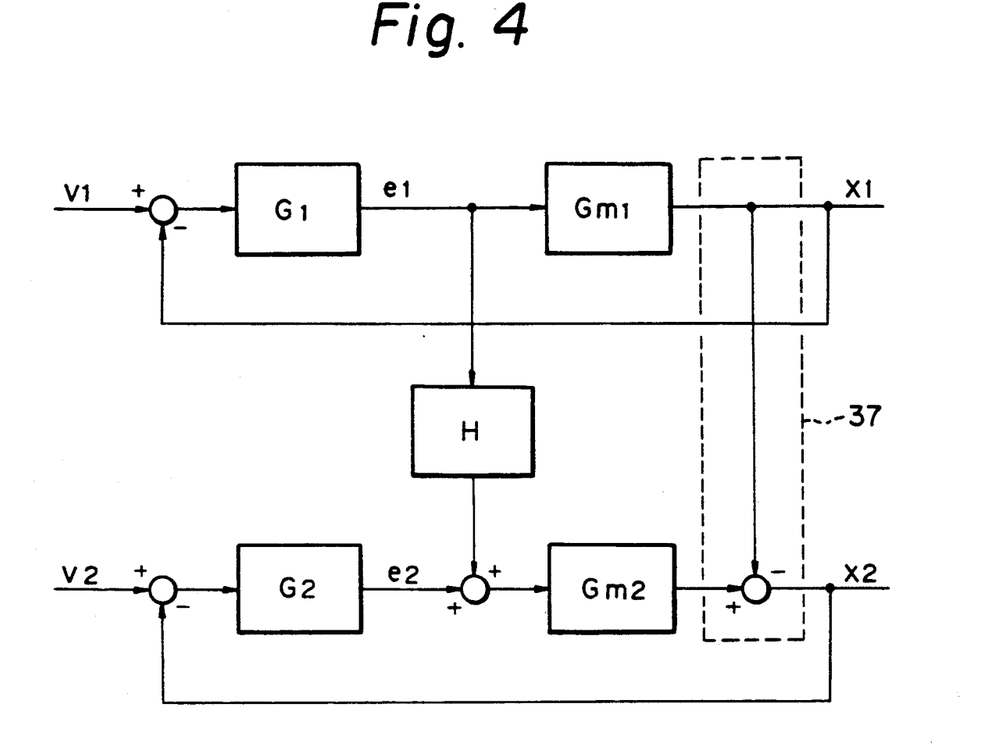
FIG. 4 is a block diagram illustrating a driving system for the tracking and focal point adjustments.

FIG. 4 is a block diagram illustrating a tracking and focal point adjustment driving system in the aforementioned optical head. In FIG. 4, designated at G1 is a transfer function in the compensator 31, G2 is the same in the compensator 32, Gm1 in the driver 35 and the coil 21, Gm2 in the driver 36 and the coil 22, H in the preceding compensator 33, V1 is a voltage indicative of a track position, V2 is a voltage indicative of a position on a disk surface, X1 is a voltage indicative of the position of a light beam in the direction of tracking, X2 is a voltage indicative of the position of a light beam, e1 is an output voltage of the compensator 31, and e2 is an output voltage of the compensator 32. Additionally, subtraction designated at 37 equivalently indicates the displacement of the focal position of a light beam due to the movement of the first relay lens 15.

Here, Laplace transformation of the driving system shown in FIG. 4 gives a relation:

$$G2Gm2V2(s) - G2Gm2X2(s) - HE1(s)Gm2 - X1(s) = X2(s) \quad (1)$$

This leads to:

$$X2(s) = \{G2Gm2/(1 + G2Gm2)\}V2(s) - \{HGm2/(1 + G2Gm2)\}E1(s) - \{(1 + G2Gm2)\}X1(s) \quad (2)$$

Here, estimation if a deviation ϵ (s) gives:

$$\begin{aligned} \epsilon(s) &= V2(s) - X2(s) \\ &= \{(1/(1 + G2Gm2)\}V2(s) + \{(HGm2/(1 + G2Gm2)\}E1(s) + \{(1/(1 + G2Gm2)\}X1(s) \end{aligned} \quad (3)$$

Subtraction 37 described previously, the transfer function H of the preceding compensator 33 may be set such that the second and third terms of the expression (3) are zero or an equation:

$$HGm2E1(s) + X1(s) = 0 \quad (4)$$

holds.

From a relation $$X1(s) = Gm1E1(s),$$

$$HGm2E1(s) + Gm1E1(s) = 0$$

$$\therefore HGm2 + Gm1 = 0$$

Thus, the transfer function H is set to satisfy a relation:

$$H = -Gm1/Gm2 \quad (5)$$

Further, decomposition of the arrangement of the driving system into $$Gm1 = A1/M1S^2$$

$$Gm2 = A2/M2S^2$$

leads (here, A1, A2: force constant of the tracking and focal point adjustment driving system, M1, M2: Mass of the same system) to:

$$\begin{aligned} H &= -(A1/M1S^2)/(A2/M2S^2) \\ &= -M2A1/M1A2 \end{aligned}$$

Figure 5:
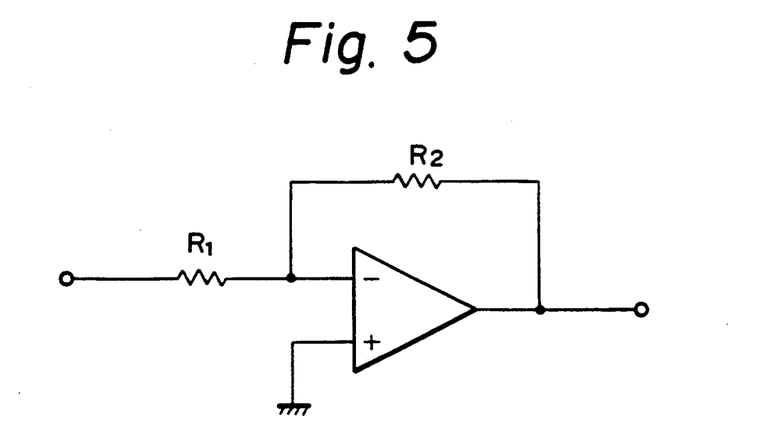
FIG. 5 is a view illustrating an example of a preceding compensator circuit.

Hereby, when an inverting amplifier of a well-known operational amplifier of the type shown in FIG. 5 is used as the preceding compensator 33, resistances R1, R2 are set so as for the guide A of the amplifier to satisfy:

$$A = -R2/R1 = -M2A1/M1A2 \quad (6)$$

The preceding compensator 33 and the adder 34, which include the transfer function H set as described above, correct the displacement of a focal position without delay, by supplying a compensation voltage to the driver 36 of the focal point adjustment control system, the compensation voltage being to compensate the foregoing displacement caused by the movement of the first relay lens 15 for tracking control.

Figure 6A:
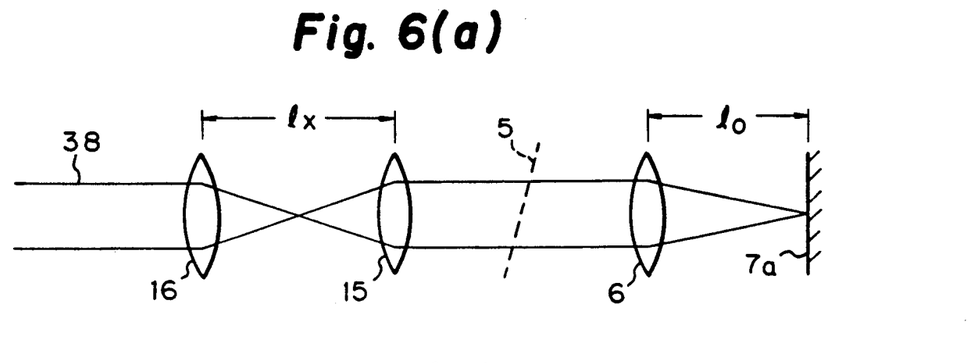
FIGS. 6(a), 6(b), and 6(c) are schematic are views each illustrating the situation of control of the focal point adjustment.
Figure 6B:
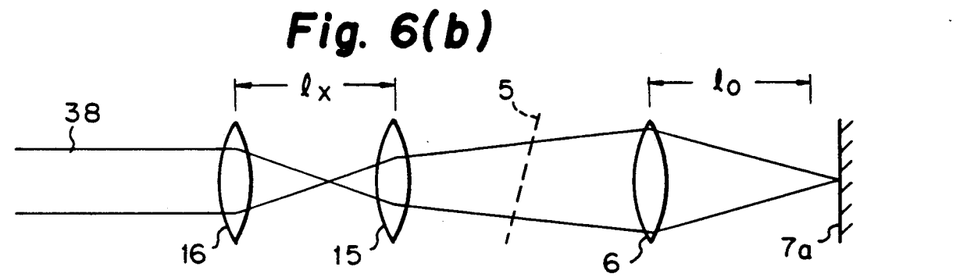
Figure 6C:
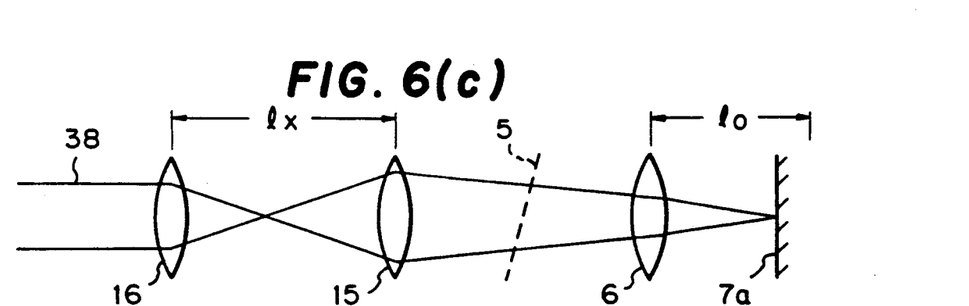

FIGS. 6(a) to 6(c) illustrate focal point adjustment control in the above device. An embodiment of such control will be described with reference to such figures.

FIG. 6(a) illustrates a light beam when the recording surface 7a of the disk is separated by a predetermined distance from the objective lens 6, for example by a focal distance lo of the objective lens 6. A parallel light beam emitted from a light source (not shown) is once focused by the relay lens 16, converted again into a parallel light beam through the relay lens 15 to enter the objective lens 6, and focused onto the recording surface 7a located at the focusing position of the above lens 6. The light beam so focused is reflected from the same surface, and transmitted, after propagating back through the objective lens 6 and the relay leneses 15, 16, to an optical detector (not shown), etc., as a parallel light beam. Here, the total sum of the respective focal distances of the lenses 15, 16 is taken to be equal to a relative distance lx between the relay lenses 15 and 16.

FIG. 6(b) illustrates a light beam when the recording surface 7a of the disk is separated by the predetermined distance or more from the objective lens 6. In this situation, the driver 36 supplies a driving current to the coils 22 on the basis of the output from the optical detector element 28 to move the carriage 20 or the relay lens 16 in a direction where the carriage 20 or the relay lens 16 approaches the relay lens 15. Thereupon, th relative distance becomes less than the total sum of the focal distances of the lenses 15 and 16, so that the parallel light beam 38 changes to a light beam slightly wider than the relay lens 15 and enters the objective lens 6. The focusing position is made larger than the focal distance lo by the objective lens 6, and when the focusing position reaches the recording surface 7a, the driving current is interrupted to complete the focal point adjustment.

FIG. 6(c) illustrates light beam where the recording surface 7a of the disk is separated by a distance less than the distance lo from the objective lens 6. In this situation, the driver 36 supplies a driving current of a polarity opposite to that of the previous situation to the coil 22 based upon the output from the optical detector element 28 to drive the relay lens 16 so as to move away from the relay lens 15. Thereupon, the relative distance lx becomes larger than the total sum of the focal distances of the lenses 15 and 16, so that the parallel light beam 38 changes to one slightly narrower than the relay lens 15 and enters the objective lens 6. The focusing position by the objective lens 6 comes nearer from the position corresponding to the focal distance lo of the objective lens 6, and when such position coincides with the recording surface 7a, the driving current is interrupted to complete the focal point adjustment.

On the other hand, when the focusing position of the optical beam in the direction of tracking by the objective lens 6 is displaced from the track position on the recording surface 7a, the driver 35 supplies a driving current to the coils 21 on the basis of the output from the optical detector element 27 to move the carriage 19 or the optical path converting prism mirror 5 and the objective lens 6 in the direction of tracking for correction of the foregoing displacement as in the conventional case.

Hereupon, as described previously, the driver 36 supplies a driving current to the coils 22 on the basis of the output from the optical detector 29 to move the carriage 20 in the direction of tracking. For this, the foregoing relative distance lx is not changed even with the movement of the carriage 19 and hence of the relay lens 15, and is kept at a distance corresponding to that between the objective lens 6 and the recording surface 7a at that time point.

Figure 7:
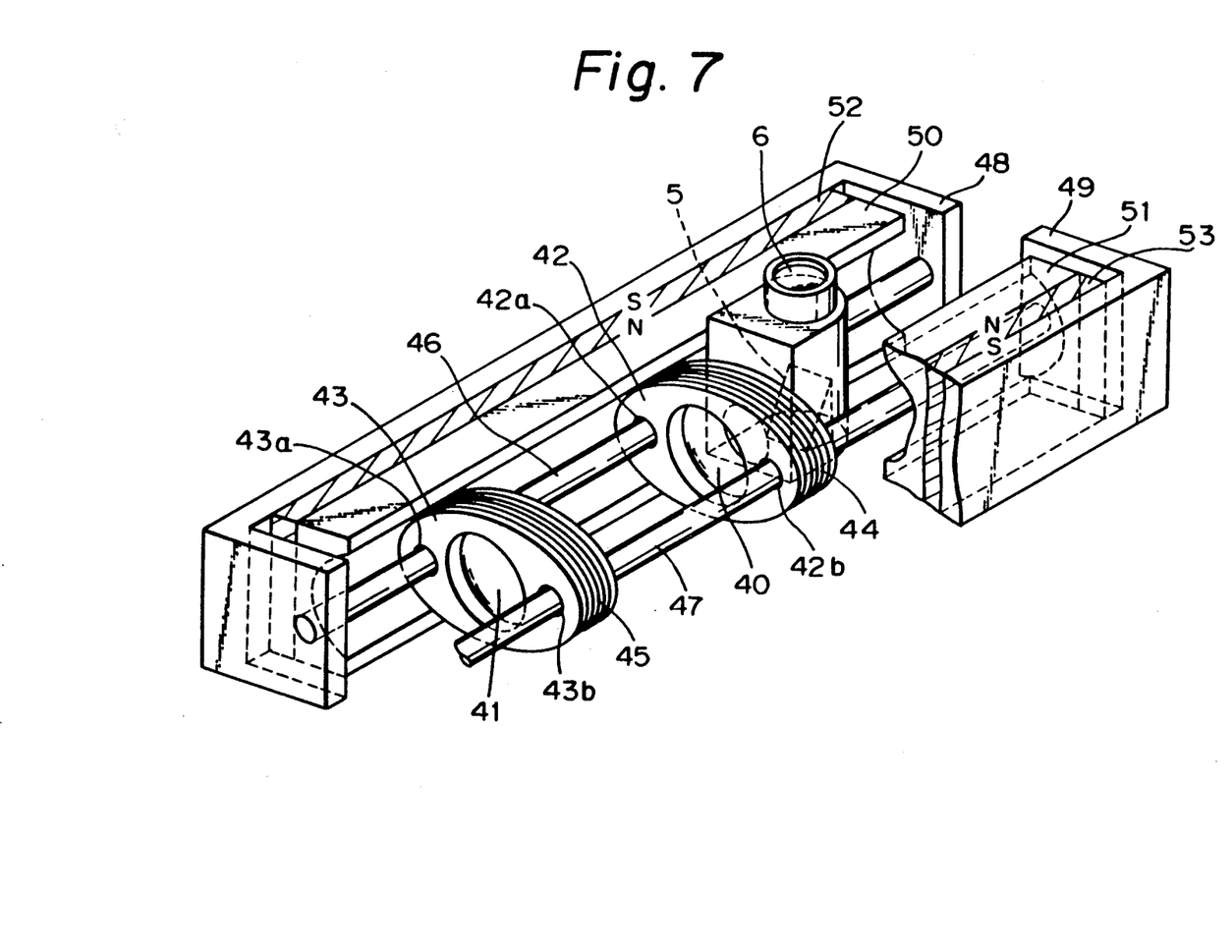
FIG. 7 is a perspective view, cut away in part, illustrating another embodiment of the optical head of the present invention.

Referring here to FIG. 7, another embodiment of the optical head according to the present invention is illustrated in which like symbols are applied to like elements as in the conventional arrangement. In FIG. 7, designated at 5 is the optical path converting prism mirror, 6 is the objective lens, 40, 41 are first and second relay lenses, respectively, 42, 43 are first and second holders, respectively, 44, 45 are first and second coils, respectively, 46, 47 are guide shafts, 48, 49, 50, and 51 are yokes, and 52, 53 are magnets.

The optical path converting prism mirror 5 and the objective lens 6 are fixedly held by the first holder 42 together with the first relay lens 40. The holder 42 is supported on the pair of guide shafts 46, 47 disposed parallel to each other and is movable only axially of such shafts via sliding portions 42a, 42b provided at opposite ends of the holder 42. Additionally, the second relay lens 41 is fixedly held by the second holder 43. The holder 43 is supported by the pair guide shafts 46, 47 and is movable only axially of such shafts via sliding portions 43a, 43b provided at opposite ends of the holder 43. Here, the first and second relay lenses 40, 41 have the same optical axis parallel to the axes of the guide shafts 46, 47.

The holder 42 includes the first coil 44 wound therearound, which coil 44 has its axis parallel to the axes of the guide shafts 46, 47, including therein the sliding portions 42a, 42b. In addition, the holder 43 likewise includes the second coil 45 wound therearound, which coil 45 has its axis parallel to the axes of the guide shafts 46, 47, including therein the sliding portions 43a, 43b.

The guide shaft 46 constitutes a magnetic circuit together with yokes 48, 50 and a magnet 52, while the guide shaft 47 constitutes another magnetic circuit together with yokes 49, 51 and a magnet 53. The coils 44 and 45 are disposed with small intervals between the guide shaft 46 and the yoke 50 and between the guide shaft 47 and the yoke 51. The holders 42, 43 are moved axially of the guide shafts 46, 47 in response to a driving current supplied from a control circuit described later.

In the respective arrangements described above, a head casing (not shown) includes the guides shafts 46, 47, the yokes 48 to 51, and the magnets 52, 53, all being fixedly mounted therein, such that the holders 42, 43 are moved in the direction of tracking of the disk. Thereupon, there are disposed on the opposite side of the relay lens 41 relative to the relay lens 40, a light source, a polarized beam splitter, a λ/4 plate, and an optical detector, etc., as in the conventional arrangement. A light beam transmitted from the above arrangement reaches the optical path converting prism mirror 5 via the relay lenses 41, 40 and is diverted 90°, is focused by the objective lens 6 to enter the recording surface of the disk (not shown), and the light beam is reflected back therefrom opposite to such original direction through the objective lens 6, optical path converting prism mirror 5, and relay lenses 40, 41.

Furthermore, tracking control and focal point adjustment control of the above device is performed as in the first embodiment.

The optical head according to the present invention simply requires that both the first and second holders be movable only in one direction, thus allowing the respective supporting means to be provided individually. This simplifies the arrangement of the optical head and facilitates the adjustment of the head upon assembly. Additionally, both the first and second holders separately include driving means correspondingly to directions in which they are movable. This prevents one holder from being mechanically vibrated as the other holder is moved, thereby assuring that its resonance frequency is shifted to a higher range.

Furthermore, the second holder is driven on the basis of control signals concerning the displacements of a focusing position and of a track position, thereby allowing the displacement of the focusing position due to tracking control to be corrected without any time delay. The present invention thus can provide a higher response optical head, thereby assuring very useful industrial applicability.

What is claimed is:

1. An optical head for controlling tracking and focal point adjustment of a light beam that mediates information for recording and information for restoration and that is emitted from an optical source and directed to a recording surface of a disk, wherein the light beam is reflected from the disk and detected, and control signals relating to displacements of a track position and of a focusing position of the light beam are generated on the basis of the detected signal, said optical head comprising:

a first holder for fixedly mounting an objective lens, an optical path converting prism mirror, and a first relay lens;

a second holder for fixedly mounting a second relay lens at a position opposed to said first relay lens;

supporting means supporting said first and second holders for movement only in a direction of tracking of the disk; and driving means for driving both said first and second holders in the direction of tracking on the basis of the control signals relating to the displacement of the focusing position and the displacement of the track position.

2. An optical head as claimed in claim 1, wherein said supporting means comprises parallel guide shafts supporting both said first and second holders, said guide shafts forming part of a yoke of a magnetic circuit.

3. An optical head as claimed in claim 2, wherein said driving means comprises coils provided on and wound around said first and second holders, each coil having an axis parallel to an axis of one said guide shaft and including therein a portion slidable on said one guide shaft.

* * * * *